United States Patent

[11] 3,622,612

[72] Inventor Erwin Muller
 Leverkusen, Germany
[21] Appl. No. 732,512
[22] Filed May 28, 1968
[45] Patented Nov. 23, 1971
[73] Assignee Farbenfabriken Bayer Aktiengesellschaft
 Leverkusen, Germany
[32] Priority July 12, 1967
[33] Germany
[31] F 52930

[54] PROCESS FOR THE PRODUCTION OF NEOPENTYLGLYCOL-CARBOXYLIC ACID-CARBONIC ACID MIXED ESTERS
 5 Claims, No Drawings

[52] U.S. Cl..................................................... 260/463,
 260/16, 260/22 R, 260/75 R, 260/861
[51] Int. Cl. .....................................................C07c 69/00,
 C08g 17/13, C08g 17/18
[50] Field of Search............................................260/463, 75
 R, 77.5 D, 77, 410.6

[56] References Cited
 UNITED STATES PATENTS
 3,207,814 9/1965 Goldberg....................... 260/860

Primary Examiner—Elbert L. Roberts
Assistant Examiner—Diana G. Rivers
Attorney—Connolly and Hutz ABSTRACT: Process for producing neopentylglycol-carboxylic acid-carbonic acid mixed esters by transesterifying a diaryl carbonate with a neopentylglycol-carboxylic acid semiester at a temperature of from about 180° to about 220° C. and the utility of such products in the production of lacquers and resins and plastics.

PROCESS FOR THE PRODUCTION OF NEOPENTYLGLYCOL-CARBOXYLIC ACID-CARBONIC ACID MIXED ESTERS

The present invention relates to a process for the production of neopentylglycol-carboxylic acid-carbonic acid mixed esters, which offers particular technical advantages.

It is known that diaryl carbonates, for example, diphenyl carbonate, can easily be transesterified with alcohols with the elimination of the corresponding phenol and with the formation of corresponding alkyl carbonates. If glycols are reacted with diaryl carbonates, the use of long-chain glycols with at least five chain members yields low-, medium-, or high-molecular straight-chain glycol carbonates or polycarbonates in accordance with the molar ratios applied, whereas the use of short-chain glycols with up to four chain members, such as ethylene-glycol, 1,2- and 1,3-propylene-glycol, neopentyl-glycol and 1,4-butane-diol yields the cyclic carbonates. The tendency to form such cyclic carbonates is so strong that it prevails even in the reaction of diaryl carbonates with esterified short-chain glycols in that a twofold transesterification takes place in this case, with the formation of the corresponding carboxylic acid aryl ester besides the cyclic carbonate. That is to say that, by heating, for example, ethylene glycol-benzoic acid mono- or diesters with diphenyl carbonate in a molar ratio of 1:1, there is obtained 1 mole of cyclic ethylene carbonate and 1 mole of benzoic acid phenyl ester and phenol or 2 moles benzoic acid phenyl ester. The reaction of, for example, 1,2-propylene-glycol- or 1,4-butane-diol-carboxylic acid esters leads to corresponding results.

Although, as a rule, branched short-chain bifunctional compounds form cyclic derivatives with particular ease, it has been found, surprisingly, that in the case where neopentylglycol-carboxylic acid esters are heated with diaryl carbonates, the twofold transesterification does not take place, i.e. with the use of the neopentylglycol-carboxylic acid diesters, a reaction with diaryl carbonate in the temperature range from about 180° to about 220° C., whereas the use of neopentylglycol-carboxylic acid semiesters leads to the formation of the corresponding neopentylglycol-carboxylic acid-carbonic acid mixed esters. The present invention for the production of neopentylglycol-carboxylic acid-carbonic acid mixed esters utilizes this observation.

The object of the invention thus comprises a process for the production of neopentylglycol-carboxylic acid-carbonic acid mixed esters, which comprises transesterifying a diaryl carbonate with a neopentylglycol-carboxylic acid semiester, optionally in admixture with monohydric alcohols or/and with glycols having at least five chain members, in the temperature range from about 180° to about 220° C., the corresponding phenol being distilled off.

Depending on whether neopentylglycol-monocarboxylic acid semiesters or -dicarboxylic acid di-semiesters are used as starting materials and on the proportion in which dicarboxylic acid semiesters and diaryl carbonate are reacted, optionally with the addition of monohydric alcohols or/and long-chain glycols, there are obtained monomeric, oligomeric or polymeric neopentylglycol-carboxylic acid-carbonic acid mixed esters.

Neopentylglycol-monocarboxylic acid semiesters which are suitable for the process are the semiesters of, for example, acetic acid, propionic acid, butyric acid, isobutyric acid, valerianic acid and of higher straight-chain or branched fatty acids as well as of unsaturated or/and substituted carboxylic acids, such as mono-, di- and trichloroacetic acid, phenylacetic acid, acrylic and methacrylic acid, crotonic acid, oleic acid, linseed oil fatty acid and cinnamic acid, further of aromatic acids, such as benzoic acid, chlorobenzoic acids, nitrobenzoic acids, toluylic acid and anisic acid.

Examples of suitable dicarboxylic acid di-semiesters are the semiesters of the following dicarboxylic acids: malonic, succinic, glutaric, adipid, pimelic, suberic, sebacic, maleic, fumaric, citraconic, mesaconic, dihydromuconic, tetrahydrophthalic, endomethylene-tetrahydrophthalic acid, phthalic acids and chlorophthalic acids.

A part from monomeric neopentylglycol-dicarboxylic acid di-semiesters, homo- or heteropolyesters with neopentyl-glycol-dicarboxylic acid semiester end groups can also be used as starting material, for example, neopentylglycol-adipic or phthalic acid polyesters with neopentylglycol semiester end groups or similar polyesters with radicals of various dicarboxylic acids.

Suitable diaryl carbonates, besides diphenyl carbonate, are, for example, dicresyl carbonates and bischlorophenyl carbonates.

Monohydric alcohols which may be added are, for example, octyl alcohol, nonyl alcohol, decyl alcohol, undecyl alcohol, dodecyl alcohol and octadecyl alcohol.

Long-chain glycols which may be added are, for example, di- and polyethylene and propyleneglycols, pentamethylene, hexamethylene, heptamethylene, and octamethylene glycol, p-phenylene-di-p-hydroxyethyl ether and 4,4'-di-(p-hydroxyethoxy)-diphenyl-dimethyl-methane, as well as polyethers with terminal hydroxyl groups or polyesters with semiester end groups of long-chain glycols.

The reaction may be carried out under reduce pressure, in order to facilitate the distilling off of the eliminated phenol.

Depending upon their composition, the products of the process are liquids of low to high viscosity or resinous substances. They can be used as plasticizers for lacquer raw materials and synthetic materials such as polyvinyl chloride or as intermediates for the production of higher or high molecular products, the higher or high molecular products as lacquer raw materials or synthetic resins. If the products contain reactive double bonds, for example, the radicals of unsaturated dicarboxylic acids, they can be polymerized or copolymerized with other polymerizable materials and thus be converted into synthetic resins or plastics.

EXAMPLE 1

A mixture of 208 g.(1 mole) neopentylglycol-benzoic acid semiester and 107 g. (0.5 mole) diphenyl carbonate is gradually heated to 220° C. on a descending cooler with stirring and the passing over of nitrogen, until phenol no longer distills over (distilling temperature 180° C.). A gradually increasing vacuum is then applied and the residual amounts of phenol are withdrawn at 200° C./12 mm.Hg. In all, 95 g. phenol (calculated 94 g.) are distilled off. The remaining mixed ester, 215 g. (theory 221 g.), is a viscous oil.

EXAMPLE 2

A mixture of 1290 g. (3.8 moles) terephthalic acid-bis-neopentylglycol ester and 750 g. (3.5 moles) diphenyl carbonate is treated under the conditions described in example 1. There are obtained 657 g. (calculated 660 g.) phenol. The remaining mixed polyester is a solid resin which melts at 60°–65 C. and has the hydroxyl number 58.8 and the acid number 0.5.

EXAMPLE 3

A mixture of 1 kg. (1 mole) of an adipic acid-neopentylglycol polyester with the g. (number 106 (=3.22 percent by weight OH) and 95 g. (0.45 mole) diphenyl carbonate is treated under the conditions described in example 1. There are obtained 90 g. (calculated 85 g.) phenol. The remaining mixed polyester is a viscous oil with the hydroxyl number 54 and the acid number 0.3.
Yield 990 g.

EXAMPLE 4

A mixture of 3040 g. (8.3 moles) of a polyester prepared from 5 moles maleic acid anhydride, 5 moles phthalic acid anhydride and 20 moles neopentylglycol and having the hydroxyl number 307 (=9.3 percent by weight OH), the acid number 0.3 and molecular weight 365, and of 1450 (6.8 moles) diphenyl carbonate is treated under the conditions described in example 1. There are obtained 1.3 kg. (calculated 1.28 kg.)

phenol. The remaining mixed polyester is a transparent yellow-colored solid resin with the hydroxyl number 51.5.
Yield 3.19 kg.

The mixed polyester dissolves in styrene. When 2 percent by weight benzoyl peroxide are added to a 70 percent solution of the polyester in styrene, the solution polymerizes at 100° C. to form a hard synthetic material.

EXAMPLE 5

A mixture of 318 g. (1 mole) adipic acid-bis-neopentylglycol ester, 1.18 kg. (10 moles), 1,6-hexane-diol and 2.54 kg. (11.9 moles) diphenyl carbonate is treated under the conditions described in example 1, whereby 2.07 kg. phenol are distilled off. A waxlike product is obtained which has a softening point of 33°–35° C., the hydroxyl number 0 and a content of 9.3 percent by weight of $-OC_6H_5$ groups; this corresponds to a mean molecular weight of 2000.
Yield 1.8 kg.

EXAMPLE 6

A mixture of 338 g. (1 mole) terephthalic acid-bis-neopentylglycol ester, 1.316 kg. (11.05 moles) 1,6-hexane-diol, and 2.350 kg. (11 moles) diphenyl carbonate is treated in the manner described in example 1, whereby 2.072 kg. (calculated 2.06 kg.) phenol are distilled off. The remaining mixed polyester is a viscous oil with the hydroxyl number 58.8 and the acid number 0.5.
Yield 1839 g.

EXAMPLE 7

A mixture of 477 g. (1.5 moles) of an adipic acid-neopentylglycol polyester with the hydroxyl number 350, 1,316 kg. (11.15 moles) 1,6-hexane-diol and 2.450 kg. (11.5 moles) diphenyl carbonate is treated in the manner described in example 1, whereby 2.2 kg. (calculated 2.16 kg.) phenol are distilled off. The remaining mixed polyester is a waxlike product of softening point 34°–35° C. with the hydroxyl number 58 and the acid number 0.
Yield 2 kg.

I claim:
1. Process for the production of neopentylglycol-carboxylic acid-carbonic acid mixed esters which comprises transesterifying a diaryl carbonate with a neopentylglycol-carboxylic acid semiester in the temperature range from about 180° to about 220° C., the corresponding phenol being distilled off.
2. Process according to claim 1, wherein neopentylglycol-monocarboxylic acid semiesters are used.
3. Process according to claim 1, wherein neopentylglycol-dicarboxylic acid disemiesters are used.
4. Process according to claim 1, wherein the neopentylglycol-carboxylic acid semiesters are reacted in admixture with monohydric alcohols.
5. Process according to claim 1, wherein the neopentylglycol-carboxylic acid semiesters are reacted in admixture with glycols having at least five chain members.

* * * * *